United States Patent
Brining

[11] 3,986,599
[45] Oct. 19, 1976

[54] MECHANICAL PART FEEDER
[75] Inventor: Douglas E. Brining, Southfield, Mich.
[73] Assignee: Feedmatic-Detroit, Inc., Southfield, Mich.
[22] Filed: Apr. 17, 1975
[21] Appl. No.: 568,910

[52] U.S. Cl. .............................. 198/569; 198/703; 198/796
[51] Int. Cl.² ........................................ B65G 47/44
[58] Field of Search ...................... 198/45, 49–51, 198/53, 61, 63, 67, 68, 72–74, 155, 157, 158, 154

[56] References Cited
UNITED STATES PATENTS

| | | | |
|---|---|---|---|
| 817,509 | 4/1906 | Northrup | 198/45 X |
| 1,269,544 | 6/1918 | Marshall | 198/73 |
| 2,400,246 | 5/1946 | Mercier | 198/73 X |
| 2,438,500 | 3/1948 | Hertzler | 198/45 |
| 2,552,192 | 5/1951 | Lawson | 198/73 |
| 2,858,929 | 11/1958 | Vamvakas | 198/45 X |
| 2,870,900 | 1/1959 | Will | 198/72 |
| 3,590,979 | 7/1971 | Lupo | 198/53 |
| 3,713,527 | 1/1973 | Ginther | 198/53 |

Primary Examiner—John J. Love
Assistant Examiner—Richard K. Thomson
Attorney, Agent, or Firm—Whittemore, Hulbert & Belknap

[57] ABSTRACT

A mechanical part feeder in which an endless conveyor elevates parts retained in pockets provided by slightly inclined transverse strips extending between endless chains and guided to incline forwardly so as to cause the strips to tilt and release the parts. These parts fall on an inclined platform over which they advance onto a plurality of separated tracks. A pivoted shelf is provided on the edge of the platform to yield if any parts extend beyond the inclined strips to avoid jamming.

4 Claims, 5 Drawing Figures

U.S. Patent     Oct. 19, 1976     3,986,599
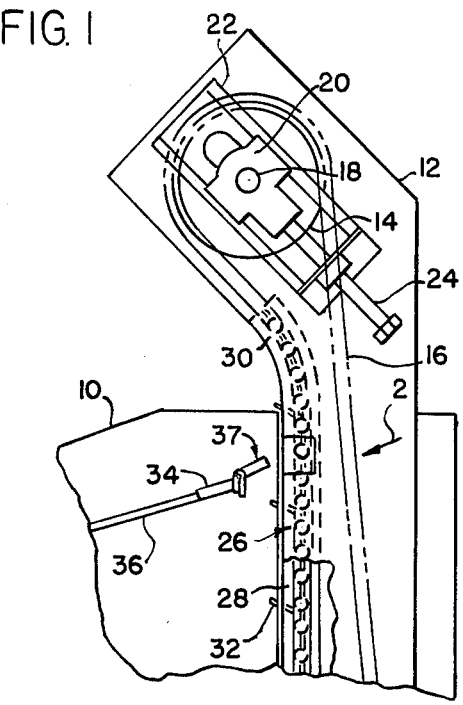
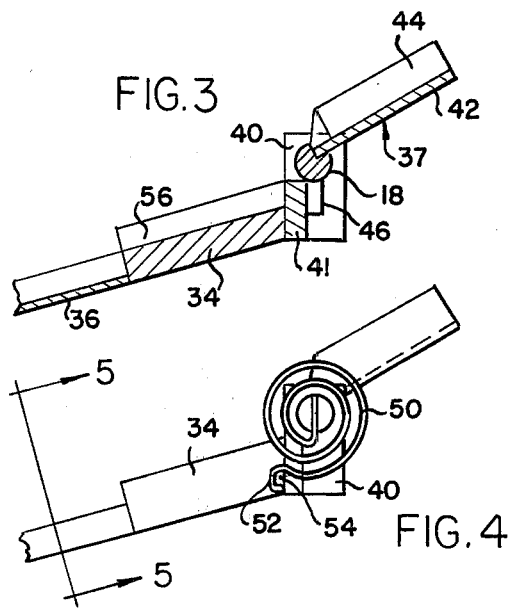
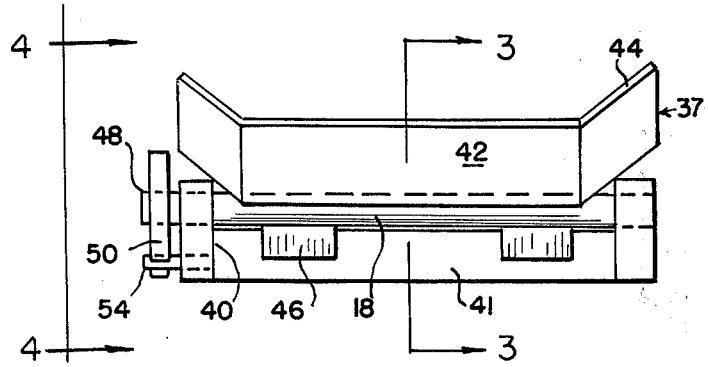
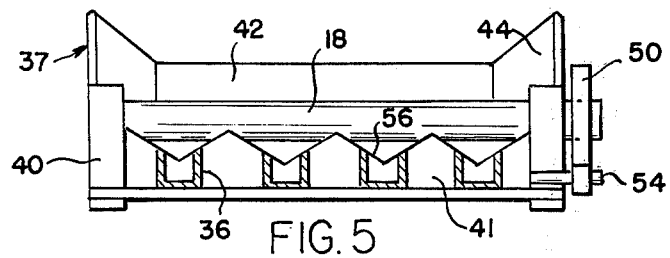

MECHANICAL PART FEEDER

BRIEF SUMMARY OF THE INVENTION

The present invention is an improvement over the subject matter illustrated in prior Lupo U.S. Pat. No. 3,590,979 which discloses an endless conveyor belt having a portion guided for vertical upward movement and then inclined from the vertical to extend over a part-receiving platform. The conveyor includes a multiplicity of transversely extending strips which are slightly inclined forward and upwardly away from the chain to define shallow part-receiving pockets. The conveyor moves through a bin or container in which a multiplicity of parts are received, and each pocket picks up a random number of parts, which may for example be bolts or the like. These parts are moved vertically above the platform and then move forwardly to a position over the platform. The inclination of the conveyor over the platform is such that the transversely extending strips tilt forwardly and downwardly so that parts received in the pockets are discharged onto the platform.

It is necessary for the vertically upwardly moving part of the conveyor to pass closely adjacent to the upper edge of the inclined platform and occasionally parts extend from the pockets defined by the transversely inclined strips into engagement with the adjacent edge of the platform. This caused the apparatus to jam with substantial damage to parts.

In accordance with the present invention the upper portion of the platform is formed by an extension of shelf which is pivoted for movement in the event that a part tends to become jammed between the extension and the conveyor. The platform itself is inclined downwardly so that parts received from the conveyor may move by gravity and/or vibration onto a series of parallel trackways. The extension is provided to extend upwardly from the upper edge of the platform toward the chain and is retained in this positon by suitable stop means. Spring means are provided retaining the extension in its normal position but permit upward yielding thereof in the event that a part carried by the conveyor tends to jam in the clearance space.

BRIEF DESCRIPTION OF THE DRAWINGS

FIG. 1 is a fragmentary side elevational view of the upper portion of the part feeder.

FIG. 2 is an enlarged fragmentary elevational view of the end of the platform, looking in the direction of the arrow 2, FIG. 1.

FIG. 3 is a sectional view on the lines 3—3, FIG. 2.

FIG. 4 is an elevational view, looking in the direction of the arrow 4, FIG. 3.

FIG. 5 is a sectional view on the line 5—5, FIG. 4.

DETAILED DESCRIPTION

In FIG. 1 only the upper end of the part feeding mechanism illustrated in detail in prior U.S. Pat. No. 3,590,979 is illustrated. The part feeder comprises frame structure 10 carrying generally upwardly extending chain support means 12 which carry sprockets 14 over which chains 16 advance. The sprockets 14 are carried by a shaft 18 the ends of which are journaled in slides 20 carried by frames 22 so that the tension of the chains 16 may be adjusted by tensioning screws 24. Guide ways indicated at 26 are provided for the chains at the opposite sides of the feeder and include a vertical portion 28 and a forwardly inclined portion 30.

Extending transversely between the chains provided at opposite sides of the feeder are a plurality of strips 32 which include back portions and slightly upwardly inclined forwardly extending portions which together define pockets for receiving a random number of parts. As the strips 32 move upwardly through the straight portion 28 of the guides the parts are retained in the pockets. However, as the strips reach the forwardly inclined portion 30 of the guide means, the forwardly extending pocket forming portions or strips 32 incline slightly downwardly with the result that the parts received in the pockets fall downwardly onto the upper edge of a part receiving platform 34 whence they move downwardly and to the left as seen in FIG. 1 onto channel shaped track elements 36. The excess of the parts falls between the tracks 36 and return to the bin through which the lower end of the chains and pocket-forming strips are movable.

In accordance with the present invention the platform 34 is provided at its upper edge adjacent the chains and transverse pocket-forming strips with a pivoted shelf or extension 37. Conveniently, the pivoted shelf is fixedly secured as by welding to a pivot shaft 18 opposite ends of which are journaled in support blocks 40 welded or otherwise secured to a bar 41 which in turn is welded or otherwise secured to the upper edge of the platform 34.

The shelf or extension indicated at 37 comprises a bottom wall 42 and upwardly inclined end walls 44 which may be formed simply by bending the end portions of the bottom wall portion 42 upwardly as best illustrated in FIG. 2.

Shaft 18 is provided with suitable stop means such as a pair of downwardly extending projections 46 engaged with the transverse bar 41, as best illustrated in FIG. 3. Preferably, the bottom wall 42 of the extension 37 is inclined at a small angle to the plane of the platform 34 and tracks 36. Conveniently, the platform 34 and tracks 36 may extend downwardly at an angle of about 15° from the horizontal, and the bottom wall 42 of the extension may extend at an angle of about 15° to the plane occupied by the platform and tracks, or at an angle of about 30° from the horizontal.

The shaft 18 is extended at one end as indicated at 48 and carries a coil spring 50 having its inner end portion extending through a slot in the end of the shaft 18. The opposite end of the spring 50 is reversely bent as indicated at 52 and receives a pin 54 welded or otherwise secured to one of the shaft mounting blocks 40.

The upper surface of the platform 34 is provided with parallel V-grooves 56, best illustrated in FIG. 5, so that parts received by the platform are guided by the grooves 56 toward the channel-shaped tracks 36.

It will be apparent from FIG. 1 that if an elongated part, such for example as a bolt or screw happens to extend to the left as seen in this Figure from the outer edge of the pocket forming strip 32, it will engage the inclined underside of the shelf or extension 37, which is permitted to yield and thus provide for passage of the part into position above the part receiving structure comprising the platform 34 and the shelf or extension 37. This permits the free edge of the pivoted shelf or extension 37 to be positioned very close to the outer edge of the shelf forming strips 32 so that any part received in a pocket carried by the chains 16 which reaches a position above the part receiving structure will fall onto the pivoted shelf or extension and thence downwardly to the platform 34.

From the foregoing it will be observed that the novel structure comprises conveyor means including a series of slightly downwardly and rearwardly tilted horizontally elongated strips forming the bottom walls of elongated pockets each of which has an open forward side and a slightly rearwardly and downwardly inclined bottom wall. Forwardly of the conveyor means is a transversely extending part-receiving structure. Means are provided guiding the series of strips or pockets vertically upwardly past the part-receiving structure and thence along a path inclined forwardly to extend over the adjacent rear edge of the part-receiving structure at an angle which causes the bottom walls of the pockets to slope forwardly and downwardly toward the open forward side thereof to discharge parts carried in the pockets over the forward edges of the strips. The part-receiving structure comprises an elongated rigid platform having a rear edge spaced forwardly from the path traversed by the forward edges of the pocket-forming strips during upward movement thereof in the vertical portion of their path. The rear edge of the platform is spaced substantially forwardly of the path traversed by the forward edges of the strips during their vertical upward movement so as to avoid any possibility of a part projecting forwardly beyond the forward edge of one of said pockets becoming wedged between the pocket and the rear edge of the platform. In order to prevent parts discharged from the pocket as a result of the forward inclination of the bottom wall thereof, there is provided a transversely elongated forwardly and downwardly inclined shelf pivoted along its forward edge to the rear edge of the platform. Stop means are associated with the shelf arranged to position the free rear edge thereof in predetermined close clearance position relative to the path of the forward edges of the strips during their vertically upward movement so that the platform will be engaged by any part projecting forwardly from the edge of one of the pockets. This will cause forward tilting of the shelf to permit passage of the part. The forward tilting of the part is limited to that which is necessary for passage of the part to maintain the shelf in position to intercept parts discharged from pockets thereabove and to guide them onto the platform.

What I claim as my invention is:

1. Part feeding apparatus comprising conveyor means including a series of slightly rearwardly and downwardly tilted horizontally elongated strips forming the bottom walls of elongated pockets each having an open forward side and slightly rearwardly and downwardly inclined bottom wall, a transversely extending part-receiving structure located forwardly of the conveyor, means guiding the series of strips vertically upwardly past the part-receiving structure and thence along a path inclined forwardly to extend over the adjacent rear edge of the part-receiving structure at an angle which causes the bottom walls of the pockets to slope forwardly and downwardly toward the open forward side thereof to discharge parts carried in said pockets over the forward edges of said strips, said part-receiving structure comprising an elongated rigid platform having a rear edge spaced forwardly from the path traversed by the forward edges of said pocket-forming strips during vertical upward movement thereof, the improvement which comprises the location of the rear edge of said platform being at a substantial spacing forwardly of the path traversed by the forward edges of said strips during vertical upward movement thereof to avoid any possibility of a part projecting forwardly beyond the forward edge of one of said pockets becoming wedged between said pockets and the rear edge of said platform, a transversely elongated forwardly and downwardly inclined shelf pivoted along its forward edge to said rear edge of said platform, stop means associated with said shelf arranged to position the free rear edge of said shelf in predetermined close clearance position relative to the path of the forward edges of said strips during vertically upward movement thereof to be engaged by a part projecting forwardly beyond the front edge of one of said pockets, and to provide forward tilting of said shelf to permit passage of such part while limiting forward tilting of said shelf to that necessary for passage of the part to keep said shelf in position to intercept parts discharged from pockets thereabove and to guide them onto said platform, and means normally urging said shelf into the position predetermined by said stops but providing for upward tilting movement thereof if a part carried by one of said pockets engages said shelf during upward movement thereof.

2. Apparatus as defined in claim 1 in which said platform is inclined downwardly away from the path of said strips, and in which said shelf in predetermined position is inclined downwardly toward said platform at a substantially greater angle from the horizontal than said platform.

3. Apparatus as defined in claim 2 in which the ends of said shelf are formed to extend upwardly to prevent displacement of parts beyond the ends of said shelf to direct them onto said platform.

4. Part feeding apparatus comprising conveyor means including a series of slightly rearwardly and downwardly tilted horizontally elongated strips forming the bottom walls of elongated pockets each having an open forward side and a slightly rearwardly and downwardly inclined bottom wall, a transversely extending part-receiving structure located forwardly of the conveyor, means guiding the series of strips vertically upwardly past the part-receiving structure and thence along a path inclined forwardly to extend over the adjacent rear edge of the part-receiving structure at an angle which causes the bottom walls of the pockets to slope forwardly and downwardly toward the open forward side thereof to discharge parts carried in said pockets over the forward edges of said strips, said part-receiving structure comprising an elongated rigid platform having a rear edge spaced forwardly from the path traversed by the forward edges of said pocket-forming strips during vertical upward movement thereof, the location of the rear edge of said platform being at a substantial spacing forwardly of the path traversed by the forward edges of said strips during vertical upward movement thereof to avoid any possibility of a part projecting forwardly beyond the forward edge of one of said pockets becoming wedged between said pockets and the rear edge of said platform, a transversely elongated forwardly and downwardly inclined shelf pivoted along its forward edge to said rear edge of said platform, stop means associated with said shelf arranged to position the free rear edge of said shelf in predetermined close clearance position relative to the path of the forward edges of said strips during vertically upward movement thereof to be engaged by a part projecting forwardly beyond the front edge of one of said pockets, and to provide forward tilting of said shelf to permit passage of such part while limiting forward tilting of said shelf to that necessary for passage of the part to keep said shelf in position to intercept parts discharged from pockets thereabove and to guide them onto said platform, and means normally urging said shelf into the position predetermined by said stops but providing for upward tilting movement thereof if a part carried by one of said pockets engages said shelf during upward movement thereof.

* * * * *